(12) United States Patent
Berendt et al.

(10) Patent No.: US 9,083,148 B2
(45) Date of Patent: Jul. 14, 2015

(54) REAL TIME EQUIVALENT MODEL, DEVICE AND APPARATUS FOR CONTROL OF MASTER OSCILLATOR POWER AMPLIFIER LASER

(75) Inventors: Martin Ole Berendt, Árvore (PT); Paulo Tiago Guerreiro, Senhora da Hora (PT)

(73) Assignee: Kongsberg Seatex AS, Trondheim (NO)

( * ) Notice: Subject to any disclaimer, the term of this patent is extended or adjusted under 35 U.S.C. 154(b) by 0 days.

(21) Appl. No.: 13/348,556

(22) Filed: Jan. 11, 2012

(65) Prior Publication Data

US 2013/0177032 A1 Jul. 11, 2013

(51) Int. Cl.
*H01S 3/09* (2006.01)
*H01S 3/13* (2006.01)
H01S 3/067 (2006.01)
H01S 3/16 (2006.01)
H01S 3/10 (2006.01)

(52) U.S. Cl.
CPC ........... *H01S 3/1306* (2013.01); *H01S 3/06754* (2013.01); *H01S 3/10069* (2013.01); *H01S 3/1305* (2013.01); *H01S 3/1618* (2013.01)

(58) Field of Classification Search
CPC .......................... H01S 3/06754; H01S 3/1306
USPC ...................... 372/38.01, 38.02, 70
See application file for complete search history.

(56) References Cited

U.S. PATENT DOCUMENTS

| 5,018,152 | A |   | 5/1991  | Linne et al. |
| 5,465,264 | A | * | 11/1995 | Buhler et al. ............ 372/31 |
| 5,740,033 | A |   | 4/1998  | Wassick et al. |
| 5,896,064 | A |   | 4/1999  | Kaku |
| 6,166,850 | A |   | 12/2000 | Roberts et al. |
| 6,381,560 | B1 |  | 4/2002  | Shah et al. |
| 6,414,788 | B1 |  | 7/2002  | Ye et al. |
| 6,417,965 | B1 |  | 7/2002  | Ye et al. |
| 6,580,321 | B1 |  | 6/2003  | Arell et al. |
| 6,825,631 | B1 |  | 11/2004 | Nakamura |
| 6,900,934 | B2 | * | 5/2005 | Lelic ................ 359/341.41 |
| 7,079,771 | B2 | * | 7/2006 | Yamane et al. ............ 398/94 |
| 7,116,688 | B2 | * | 10/2006 | Sauter et al. ............ 372/25 |
| 7,202,997 | B2 |  | 4/2007  | Iizuka et al. |
| 7,233,606 | B2 |  | 6/2007  | Varshneya et al. |
| 7,319,040 | B2 |  | 1/2008  | Vaidyanathan et al. |

(Continued)

OTHER PUBLICATIONS

Alberto Bononi, "Doped-Fiber Amplifier Dynamics: A System Perspective," Journal of Lightwave Technology, May 1998, pp. 945-956. vol. 16, No. 5. IEEE.

(Continued)

*Primary Examiner* — Tod T Van Roy
(74) *Attorney, Agent, or Firm* — San Diego IP Law Group LLP

(57) ABSTRACT

The present invention provides, in at least one embodiment, a system and method for power control of lasers. The system includes a device's control signal fed into a laser. The laser can be a master oscillator power amplifier (MOPA) fiber laser. The device includes an equivalent model circuit representing at least one parameter of the laser, such as the gain fiber inversion in the power amplifier. The device measures the power at the equivalent model circuit. Then, the device uses its feedback signal to control and/or adjust the output power control signal fed into the laser based on the measured power. By controlling the power fed into the laser, the laser can be operated at much lower frequencies while keeping the laser power within acceptable limits.

13 Claims, 6 Drawing Sheets

(56) References Cited

U.S. PATENT DOCUMENTS

2002/0048169 A1* 4/2002 Dowling et al. .............. 362/234
2009/0097507 A1* 4/2009 Zhu et al. .................... 372/6
2010/0172383 A1* 7/2010 Montalvo et al. .......... 372/38.01

OTHER PUBLICATIONS

Benjamin Pen-Cheng Tsou, "Equivalent-circuit modeling of quantum-well lasers and fibre-optic communications channels," Thesis for Doctor of Philosophy—PhD, Electrical and Computer Engineering, Apr. 2000, pp. 1-173, The University of British Columbia.

Y. Sun et al., "Model for gain dynamics in erbium-doped fibre amplifiers," Electronics Letters, Aug. 1996, pp. 1490-1491, vol. 32 Issue:16.

Yan Sun et al., "Time Dependent Perturbation Theory and Tones in Cascaded Erbium-Doped Fiber Amplifier Systems," Journal of Lightwave Technology, Jul. 1997, pp. 1083-1087. vol. 15, No. 7. IEEE.

* cited by examiner f > fT f = fT f << fT

REAL TIME EQUIVALENT MODEL, DEVICE AND APPARATUS FOR CONTROL OF MASTER OSCILLATOR POWER AMPLIFIER LASER

BACKGROUND OF THE INVENTION

1. Field of Invention

The invention relates generally to lasers and more particularly, to techniques for controlling amplifier power in master oscillator power amplifier (MOPA) fiber lasers.

2. Description of Related Art

Pulsed lasers are lasers which emit light not in a continuous mode, but rather in the form of optical pulses. Depending on the pulse duration, pulse energy, pulse repetition rate and wavelength required, different methods for pulse generation and types of pulse lasers may be used. For example, various types of Q-switched lasers can be used to generate nanosecond pulse durations. High pulse energies are achievable with solid-state bulk lasers. For smaller pulse energies, a microchip laser or a fiber laser can be suitable. For boosting the average power (particularly of high repetition rate pulse trains with moderate pulse energies), high-power fiber amplifiers can be used.

Power scaling of a laser is increasing its output power without changing the geometry, shape, or principle of operation. Power scalability is considered an important advantage in a laser design. Usually, power scaling requires a more powerful pump source, stronger cooling, and an increase in size. It may also require reduction of the background loss in the laser resonator and, in particular, in the gain medium. The most popular way of achieving power scalability utilizes a "MOPA" (Master Oscillator Power Amplifier) approach. The master oscillator produces the desired pulse train, and an optical amplifier is used to increase the power of the beam while preserving its main properties. The master oscillator has no need to be powerful and has no need to operate at high efficiency because the efficiency is determined mainly by the power amplifier.

Pulsed MOPA fiber lasers require control of the population inversion, that is, the stored energy, in order to perform at low frequency and when gated on and off. The amount of population inversion buildup between pulses directly determines the energy content of the output pulse of the laser. The buildup reaches equilibrium for a given medium when stimulated and spontaneous deexcitation balances off the pump excitation. When the laser is operated at a high pulse repetition frequency, the laser can safely reach this equilibrium with continuous pumping. In this case, the pulse power can be controlled by regulating the level of the pump power. For MOPA lasers to operate at low pulse repetition frequency, pump control is required as the equilibrium would be at stimulated and spontaneous deexcitation levels which would either cause spontaneous lasing or peak power levels causing catastrophic optical damages to the amplifier.

Prior techniques utilizing pump control often do so through a lookup table, from which an estimate of the correct amount of pumping energy and duration to apply per fired pulse can be found in order to control the pump. The lookup table is generated by calibrating the laser across its operating range of pulse repetition frequencies, pulse widths and power settings. The pump power and duration for the lookup table depend on many variables, including the pulse profile, power set-point, pulse repetition frequency, and on/off gating history. Electronics are used to implement the lookup table and apply the correct pump power and duration for the particular operating points. However, the lookup table is a poor solution, since the process of creating it is time consuming, laborious, and difficult. Also, the laser is still limited to the operating points contained in the lookup table. Furthermore, the lookup needs to happen in real time, placing demanding requirements on the electronics and inevitably forcing a compromise between timing and accuracy.

Given the limitations of calibration approaches, most current systems avoid the problem of controlling the inversion by limiting operation to high frequencies, as high frequencies do not require pump control. However, limiting the operating frequency range to only high frequency limits the number of applications in which the laser can be used. For example, the maximum measurable distance in a light detection and ranging (LIDAR) system can be limited by pulse ambiguity if low frequency pulses are not used.

Feedback techniques have also been implemented to control pump power. FIG. 1 illustrates a conventional pump control system 100 utilizing a feedback technique. Here, the pump control system 100 comprises a laser system 110, a controller 120, and an optical sensor 130. The laser system 110 comprises, among other things, a controllable pump energy source (e.g., laser diode) coupled to a gain medium. The laser diode generates radiation which causes a population inversion within the gain medium to drive the laser. The sensor 130 (e.g., photodetector) is coupled to the gain medium to detect the magnitude of fluorescence from the gain medium, which is related to the amount of population inversion in the gain medium. The sensor 130 generates a signal reflecting the magnitude of the detected fluorescence. The sensor signal is fed to the controller 120 in order to approximate the error between the actual laser pulses emitted from the laser system 110 to those desired in a particular application. Based on the approximated error, the controller 120 adjusts the pump energy source accordingly to better achieve the desired output laser pulses. For example, the controller 120 may adjust the magnitude and switching rate of a voltage applied to a laser diode from a set point voltage value. U.S. Pat. No. 5,018,152 to Linne, the entire disclosure of which is incorporated by reference herein, discloses such a feedback technique in a Q-switched laser system.

A drawback of utilizing such a feedback technique is that it relies on optical measurement of the magnitude of fluorescence from the gain medium. The fluorescence measurement gives a value from which the inversion has to be inferred. Linne suggests measurement of the transverse fluorescence, which for short gain medium, e.g., a rod, can give a reasonable estimation of the inversion. For an optical fiber gain medium, the transverse fluorescence value will depend on the point of measurement. The fluorescence can be measured in the longitudinal fiber direction, as core guided or as cladding guided radiation. However, in this case, the fluorescence detection device needs to tolerate the high pump or signal power also present at those locations. Even with optical filters, a system with sufficient power handling will generally lack the resolution necessary to accurately estimate the error in laser inversion. This is due to the limitations in dynamic range of converting intensity in the optical domain to voltage in the electrical domain. Moreover, the magnitude of fluorescence at some points is not an accurate measurement of the effective population inversion in the gain medium. These drawbacks with prior known approaches lead to a cumbersome system and poor control of the of the gain medium and hence output energy.

Accordingly, a need has arisen to better measure and/or estimate the population inversion found in a gain medium in order to control the power supplied to the gain medium.

SUMMARY OF THE INVENTION

The present invention overcomes these and other deficiencies of the prior art by providing a power control technique for pulsed lasers where the population inversion within the gain medium of the laser is modeled in electrical circuitry in real-time. A closed feedback loop control signal is provided to control the power of the pump to the gain medium. The present invention enables control of the pump power in fiber lasers in such a way that the laser output pulse energy tracks a set-point when the pulse train is gated or the pulse repetition frequency is changed or pulse profile (e.g., pulse width) is switched.

In one embodiment of the invention, a system comprises: a laser having an optical amplifier; a controller receiving a set point; and an analog circuit model attached to the controller and the laser, the model modeling a state variable of the optical amplifier, e.g. average inversion in the laser. The model uses closed loop feedback to track the set point and the model applies the control signal to the optical amplifier of the laser. The model of the optical amplifier may be configured to be measured and may comprise digital circuitry or analog circuitry, wherein the analog circuitry may comprise a capacitor. The optical amplifier may comprise a state variable, wherein the state variable may comprise a gain fiber inversion. The laser may comprise an energy reservoir in the optical amplifier, a fiber laser, or a master oscillator power amplifier.

In another embodiment of the invention, a device comprises: a controller receiving a set point; and a digital model attached to the controller and configured to be attached to a laser, the laser having an optical amplifier, the model modeling the optical amplifier of the laser, wherein the model uses a control feedback signal to track a set point and the model infers a control signal to apply to the optical amplifier of the laser. The model of the laser optical amplifier may comprise digital circuitry implemented in gate arrays (FPGA, CPLD) or numerical computer and analog circuitry. The optical amplifier model may comprise a state variable model, wherein the state variable may comprise the gain fiber inversion. The laser may comprise a stored energy reservoir, a master oscillator power amplifier, or a fiber laser.

In a further embodiment of the invention, a method comprises the steps of: receiving a set point; modeling an optical amplifier of a laser; using feedback to track a set point; and applying a control signal to the optical amplifier of the laser. The model of the optical amplifier may comprise digital circuitry or analog circuitry, wherein the analog circuitry may comprise a capacitor to model the amplifier energy storage.

An advantage of the present invention is that it allows operation of pulsed lasers at low frequencies and allows gating of pulse trains. Further, the present invention, through the device, easily assesses and controls parameters of the amplifier that were previously not easily measureable. Additionally, the present invention does not require a laborious lookup table to control laser pulse energy.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Figure 1:
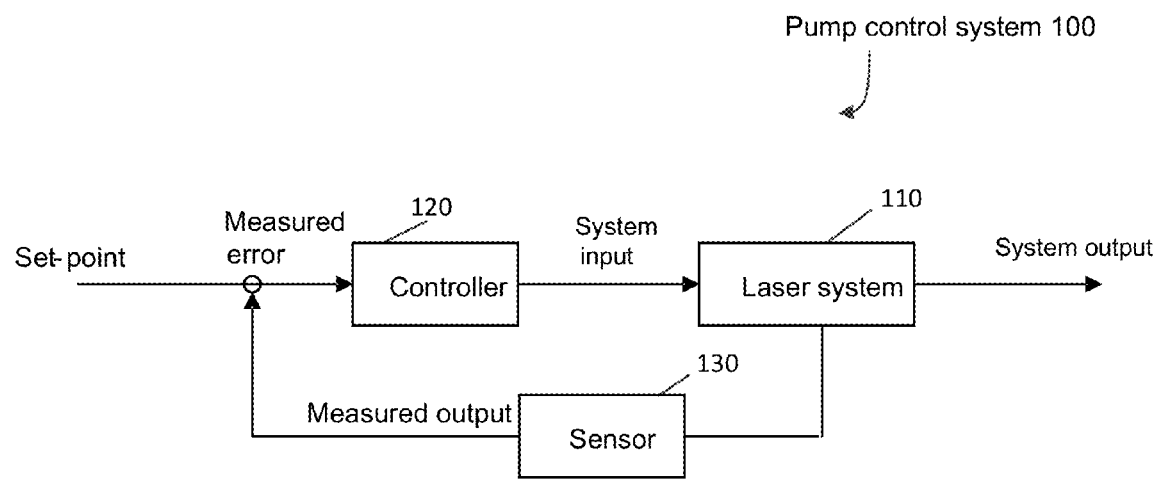
FIG. 1 illustrates a conventional pump control system utilizing a feedback technique.

Further features and advantages of the invention, as well as the structure and operation of various embodiments of the invention, are described in detail below with reference to the accompanying FIGS. 2-6, wherein like reference numerals refer to like elements. Although the invention is described in the context of fiber amplifiers and fiber lasers, one of ordinary skill in the art appreciates that the control techniques disclosed herein can be applied to any system in which a state variable can be estimated in real time such that the model state variable can be controlled by a closed loop feedback. The system control signal is inferred from the model closed loop signal. In particular, the invention applies to different types of pulsed laser such as, but not limited to Q-switched lasers, solid state bulk lasers, microchip lasers, excimer lasers, mode-locked lasers, gain-switched semiconductor lasers, and cavity-dumped lasers.

The present invention provides, among other things, a pulse energy control technique where the population inversion within a gain medium is modeled in electrical circuitry. For example, it has been shown that gain dynamics in doped-fiber amplifiers can be simulated by software. See, e.g., Bononi et al., Using SPICE general-purpose circuit simulation program to simulate Gain Dynamics in Doped-fiber Amplifier Chains, OFC'98 Workshop 204, Feb. 23, 1998. However, in the present invention, hardware is used to model the population inversion of the gain medium. In general, a known perturbation (i.e., pulse or pulse signal) is fed both to the laser system and the model. The model replicates the laser system's dynamic response to the perturbation and to internal spontaneous changes in the electrical domain, i.e., voltage as a function of time. A feedback signal derived from the model permits control of the of laser system's pump power, which results in stabilization of the output pulses to a predetermined and desired output. For example, the feedback signal provided by the model allows control of the power fed into the laser such that the laser's amplifier is pumped to the desired level of stored energy at the instance a pulse is fired. By controlling the power fed into the laser, the laser can be operated at much lower frequencies and on/off gated, while keeping the laser pulse energy and peak power within acceptable limits.

Figure 2:
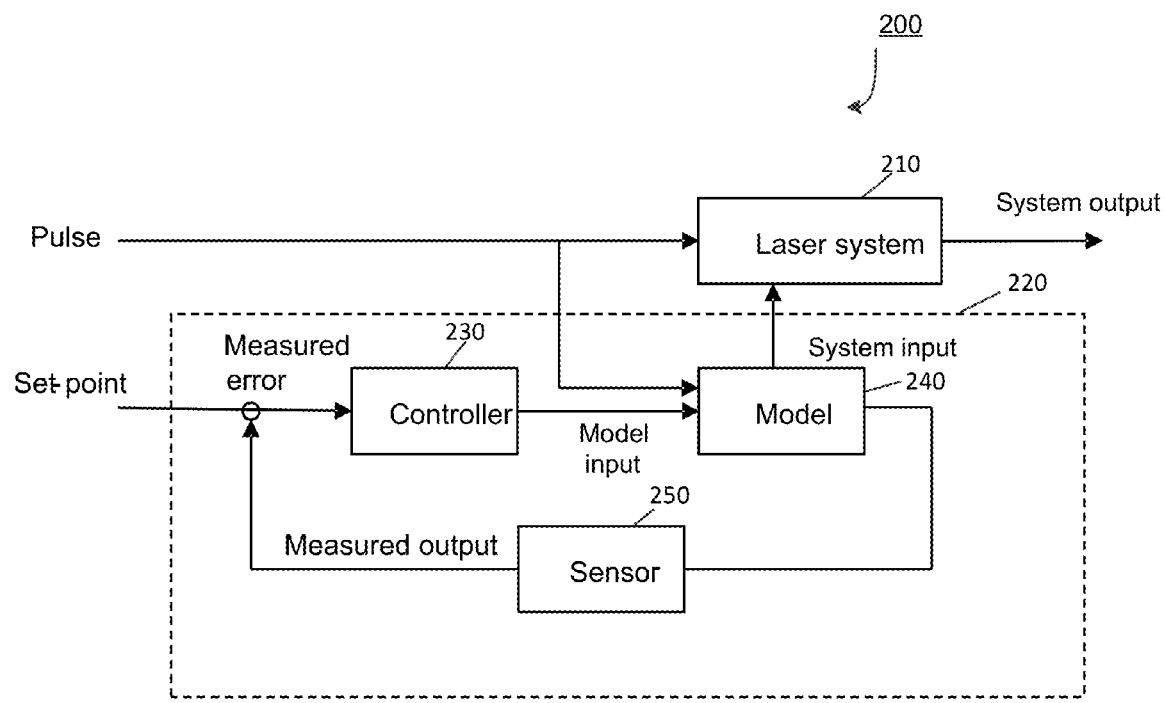
FIG. 2 illustrates a laser control system utilizing a population inversion model according to an embodiment of the invention.

FIG. 2 illustrates a laser control system 200 (e.g., controlled pulsed MOPA fiber laser system) utilizing a population inversion model 240 according to an embodiment of the invention. FIG. 2 is intended to cover more general cases such as analog control. In general, FIG. 2 illustrates that the design is different from optical monitoring based feedback shown in FIG. 1. Particularly, the laser control system 200 comprises a laser system 210 and control circuitry 220. In a preferred embodiment of the invention, the laser system 210 (or "laser") is a conventional pulsed MOPA fiber laser, the implementation of which is apparent to one of ordinary skill in the art. The MOPA fiber laser comprises a fiber amplifier (not shown) coupled to a pump (not shown), e.g., laser diode pump. The fiber amplifier is fed by an optical pulse source (not shown), also known as a seed laser source or master oscillator. The laser system 210 has an optical pulse output, which can be set by a user. The laser system 210 has at least one optical amplifier having at least one pump source. For example, the power and instance of the pulses may be set by a user through external control signals, the implementation of which is apparent to one of ordinary skill in the art.

The control circuitry 220 comprises a controller 230, an equivalent model circuitry 240, and a sensor 250. The control circuitry 220 predicts the amplifier pump power (also known as a control signal) to apply to track the set point (e.g., a pulse energy set-point). The equivalent model circuitry 240 closely mimics the dynamics of the laser system 210 through electronics including, but not limited to field-effect transistors (FETs), comparators, resistors, and capacitors. In other words, the electronics of the equivalent model circuitry 240 model (in the electrical domain) models the magnitude of population inversion within the fiber amplifier.

The controller 230 contains the circuitry necessary to interpret the error signal and apply a servo signal to the model 240. The model 240 receives a pulse command signal and the servo signal from the controller 230 and a variable in the model 240 follows the dynamics of a state variable (e.g., the optical amplifier) in the laser system 210, e.g., the average population inversion. The sensor 250 can compare a model variable with a set point. The voltage output of the equivalent model circuitry 240, which is an accurate representation of the population inversion, is measured by the sensor 250 and applied to the controller 230.

However, other parameters of the fiber amplifier may be modeled as well. For example, it is possible to model temperature. In this case, the control circuitry 220 could limit the pumping if the local temperature rises above some limit. Temperature control (e.g., temperature compensation) could also be performed based on the dissipated optical energy in the fiber, nonlinear stimulated Brillouin and Raman scattering, or laser gain.

The control circuitry 220 controls the pump power in the laser system 210 so that the output pulses of the laser system 210 track a set-point value, i.e., the desired pulse power, when the pulse train is gated on and off, the pulse repetition frequency is changed, or the pulse profile (e.g., pulse width) is switched. The control circuitry 220 may be implemented as digital circuitry as well as analog circuitry. For example, a gate-array based digital embodiment can make use of nonlinear counters such as binary logarithmic counter techniques or numerical processing such as a digital signal processor or a floating point computer, the implementation of which are apparent to one of ordinary skill in the art, to model the exponential behavior of the population inversion of the gain fiber. Alternatively, a digital computer can be used to implement the model 240 in the control circuitry 220.

The controller 230 receives and compares the set-point voltage to the measured output at the sensor 250 to determine the error ("measured error") or deviation between the set point for the model variable and the actual value. For instance, a comparator in the controller 230 determines when the variable passes the set point and produces a digital output telling if the variable is below or above the set point. The controller 230 provides the model input to the model 240. Hence, the control circuitry 220 provides a closed feedback loop as pulses are emitted synchronously from the laser system 210. This closed feedback loop permits the proper amount of pump power to be applied to the laser system 210.

The model 240 can be manipulated to give a prescribed deviation from the laser system's behavior, and in particular, increasing the pulse energy for decreasing frequency. A model pump term can be dependent on the system pump bias voltage; in particular to keep inversion constant when pump bias voltage is changed. Passive circuit elements (e.g. resistors) can be selected to have temperature dependencies passively compensating temperature dependencies of the system 200. The pump pulse may be temporally shaped to compensate dip in gated bursts of pulses.

Figure 3:
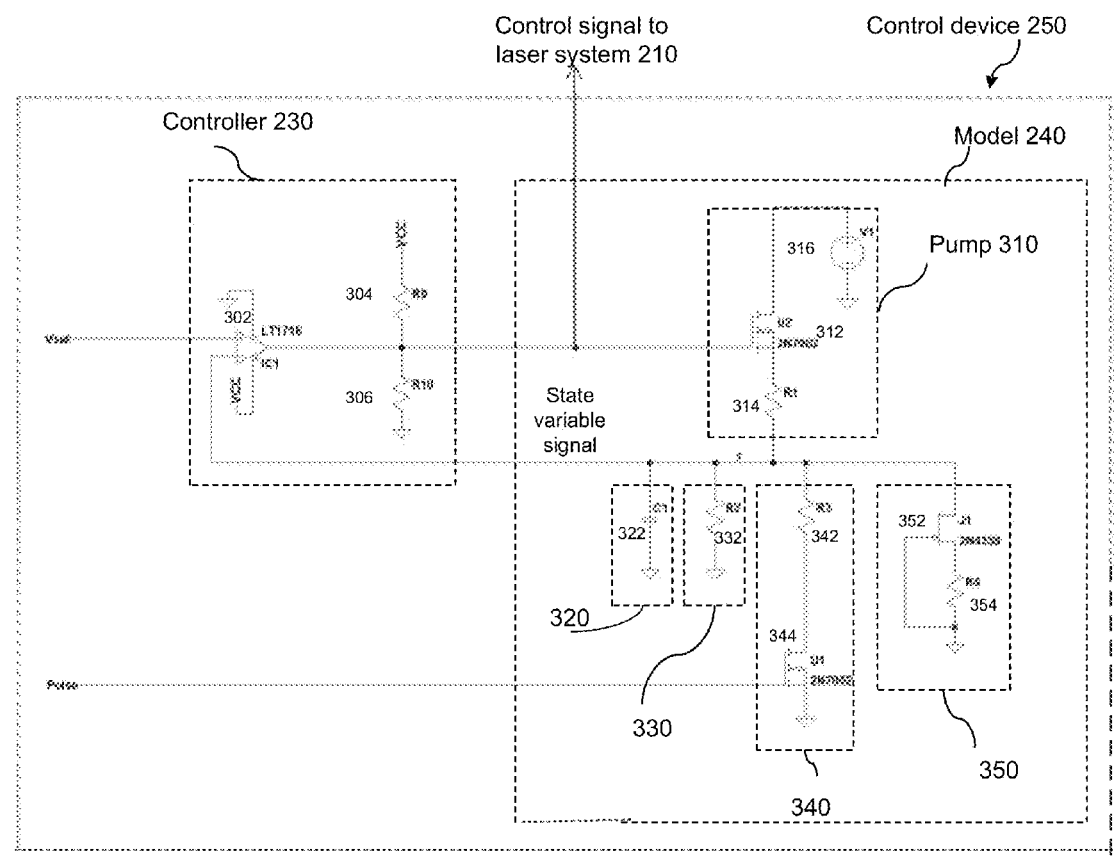
FIG. 3 illustrates the control circuitry of FIG. 2 according to an exemplary embodiment of the invention.

FIG. 3 illustrates the control circuitry 220 according to an exemplary embodiment of the invention. This embodiment is a very simple on/off control, where the signals need no conditioning. FIG. 3 is a representation that works both for Erbium and Ytterbium doped MOPA fiber lasers. The on/off control signal is wired straight to the model 240 and to the laser system pump driver 210. By conditioning the controller 230, and model pump 310, it is also be possible to use analog control (proportional-integral-derivative PID control).

The controller 230 and the sensor 250 comprise a comparator 302 and two resistors 304 and 306. The comparator 302 receives as input the set-point voltage and the voltage output of the equivalent model circuitry 240. The output of the controller 230 is a control signal, which is coupled to the pump driver of the laser system 210 and an input of the equivalent model circuitry 240.

The equivalent model circuitry 240 comprises a first circuit 310, a second circuit 320, a third circuit 330, a fourth circuit 340, and a fifth circuit 350. The first circuit 310 models the pumping of the laser system 210 and comprises FET 312, resistor 314, and voltage source 316 defining the equivalent pump rate. The first circuit 310 receives as input the control signal supplied by the controller 230. The output of the first circuit 310 is coupled to the second, third, fourth and fifth circuits 320-350. The second circuit 320 comprises a capacitor 322, the voltage on which is the equivalent of the system state variable, e.g., average degree of inversion. The third circuit 330 comprises a resistor 332 allowing for discharge of the capacitor equivalent to spontaneous deexcitation in the laser. The fourth circuit 340 comprises a resistor 342 and a FET 344 giving gated discharge equivalent to the stimulated deexcitation by amplification of a seeder optical pulse. The fifth circuit 350 comprises a FET 352 and a resistor 354. The circuit 350 is not part of the theoretical equivalent model but allows for manipulation of the model's behavior. In the shown case, a constant (voltage independent) discharge term is used to produce a pulse energy which increases with decreasing frequency in a controllable way.

The FET 344 of the fourth circuit 340 receives as an input a voltage signal corresponding to the optical pulse provided by the pulse source of the laser system 210. The fourth circuit 340 mimics the stimulated emission dynamics of the laser system 210, the larger the voltage on the capacitor 322, the larger the discharge in a given pulse duration where the transistor 344 is conducting. This is equivalent to the larger gain at higher inversion leading to larger deexcitation. The fifth circuit 350 acts as a model correction. The third circuit 330 mimics the spontaneous emission dynamics of the laser system 210. The larger the voltage on the capacitor 322, the larger the current through the resistor 332. This is equivalent to the larger spontaneous and amplified spontaneous deexcitation at higher average inversion level in the laser amplifier. The second circuit 320 provides an output signal (or "state variable signal"), which is the voltage across the capacitor 322 and is representing the average population inversion found in the laser fiber amplifier.

Mathematically the equivalent model is based on rate and photon equations for the active ions in the doped gain fiber. The reduced equations allow the variation of the reservoir, the "charge" in the amplifier to be interpreted as the total input flux, minus the output flux, minus the spontaneous decay. Analytical expressions can be used for these flux terms. These can be included in electrical circuit simulation software as abstract controlled current sources. For a circuit embodiment further simplification is needed. The amplifier state variable the reservoir (r) is the total number of excited ions:

$$\dot{r} = -\frac{r(t)}{\tau} + \sum_{j=0}^{N} Q_j^{in}(t)[1 - e^{B_j r(t) - A_j}]$$

where $r(t) = \rho A \int_0^L N_2(z,T)dz$, the total number of excited ions in the amplifier of length L, N2 is the fraction of excited ions $0 \leq N2 \leq 1$. Further:

$A_j = \rho \Gamma_j \sigma_j^a L$ and $B_j = \Gamma_j \sigma_j^T / A$ with $\tau$ being the fluorescence life time, $\rho$ is the ion density in the doped fiber core of effective area A; $\Gamma k$, $\sigma ek$, and $\sigma ak$ are the confinement factor, and the emission and absorption cross sections of channel k, respectively, and $\sigma Tk = \sigma ek + \sigma ak$. The length of the gain fiber in the amplifier is L.

In this system only one signal S and the pump P are considered:

$$\dot{r} = -\frac{r(t)}{\tau} + Q_S^{in}(t)[1 - e^{B_S r(t) - A_S}] + Q_P^{in}(t)[1 - e^{B_P r(t) - A_P}]$$

$$\dot{r} = -\frac{r(t)}{\tau} + Q_S^{in}(t)[1 - g_S(r)] + Q_P^{in}(t)[1 - g_P(r)]$$

Taylor expanding the exponential ($e^x = 1 + x + x^2/2! + \ldots$) gain/absorption functions gives:

$$\dot{r} = -\frac{r(t)}{\tau} + Q_S^{in}(t)[1 - (g_S^0 + g_S^1 r + g_S^2 r^2 + \ldots)] + Q_P^{in}(t)[1 - (g_P^0 + g_P^1 r + g_P^2 r^2 + \ldots)]$$

$$= -\frac{r(t)}{\tau} + Q_S^{in}(t)[-g_S^1 r - g_S^2 r^2 + \ldots] + Q_P^{in}(t)[-g_P^1 r - g_P^2 r^2 + \ldots]$$

The state variable r in the amplifier is equivalent to the voltage V on a capacitor and the photon fluxes are equivalent to electrical currents I. Recalling that for a capacitor:

$$\frac{dV}{dt} = \dot{V} = \frac{1}{C} I(t)$$

Comparing with Ohm's law (V=IR), the first order terms are equivalent to charging or discharging through a resistor.

$$\frac{dV}{dt} = \dot{V} = \frac{1}{C} I(t) = \frac{1}{RC} V(t)$$

The higher order terms ($g^2$, . . . ) can be represented by nonlinear circuit elements like diodes.

Note that the simplified model with first order approximation is not linear, it is exponential as expected for the amplifier pumping and de-excitation behavior. These considerations leads to the modeling of the complicated dynamics of the power amplifiers by one capacitor and three resistors, one for pumping, one for signal de-excitation and one for spontaneous de-excitation.

$$\dot{r} = -\frac{r(t)}{\tau} - Q_S^{in}(t)g_S^1 r(t) - Q_P^{in}(t)g_P^1 r(t)$$

$$\dot{V} = \frac{1}{RC_\tau} V(t) + \frac{1}{RC_S} V(t) + \frac{1}{RC_P} V(t)$$

$$RC_\tau = -\tau$$

$$RC_S = -\frac{1}{Q_S^{in}(t)g_S^1} =$$

$$-\frac{1}{Q_S^{in}(t)B_S e^{B_S r(0) - A_S}} = -\left(Q_S^{in}(t)\frac{\Gamma_S \sigma_S^T}{A} \exp\left(\frac{\Gamma_S \sigma_S^T}{A} r(0) - \rho \Gamma_S \sigma_S^a L\right)\right)^{-1}$$

$$RC_P = -\frac{1}{Q_P^{in}(t)g_P^1} = -\frac{1}{Q_P^{in}(t)B_P e^{B_P r(0) - A_P}} =$$

$$-\left(Q_P^{in}(t)\frac{\Gamma_P \sigma_P^T}{A} \exp\left(\frac{\Gamma_P \sigma_P^T}{A} r(0) - \rho \Gamma_P \sigma_P^a L\right)\right)^{-1}$$

Below are numerical values for the equations above:

| Time Constant Numerical Example | |
|---|---|
| c (m s^-1) | 2.98E+08 |
| h (Js) | 6.63E−34 |
| Signal Lambda(m) | 1.06E−06 |
| Signal Power(W) | 1.00E−03 |
| Qsin (1/s) | 5.39E+15 |
| Pump Lambda(m) | 9.15E−07 |
| Pump Power(W) | 1.00E+00 |
| Qpin (1/s) | 4.63E+18 |
| Γs factor | 0.85 |
| Γp factor | 0.01 |
| σSa (m^−2) | 5.00E−27 |
| σSe (m^−2) | 3.40E−25 |
| σST (m^−2) | 3.45E−25 |
| σPa (m^−2) | 8.00E−25 |
| σPe (m^−2) | 5.00E−26 |
| σPT (m^−2) | 8.50E−25 |
| D (m) | 7.00E−06 |
| A(m²) | 3.85E−11 |
| L(m) | 6.00E+00 |
| ρ(m^−3) | 2.00E+25 |
| τ(s) | 8.40E−04 |
| N2(0) fractional inversion 0 -1 | 2.00E−01 |
| r(0) | 9.24E+14 |
| RCs (s) | −3.5604E−05 |
| RCp (s) | −2.2109E−03 |
| Circuit example | |
| C (nF) | 100.00 |
| Rt (kohm) | 8.40 |
| Rs (kohm) | 0.36 |
| Rp (kohm) | 22.11 |

Above is a numerical example using values for an Yb doped cladding pumped amplifier fiber. Taking a value of the capacitor 322 of 100 nF the resistors setting the time constants for spontaneous decay resistor 332, signal stimulated decay resistor 342, and the pump excitation resistor 314 are 8.4 k ohm, 360 ohm, and 22 k ohm, respectively. These values are in the range of commonly used resistor and capacitor values allowing a straight forward implementation with standard printed circuit board technology. Rt represents spontaneous emission which gives a slow decay compared to the signal stimulated emission represented by Rs. This is consistent with the expected avalanche amplification effect. The model has neglected the fact that the spontaneous emission also experiences amplification, so called ASE (Amplified Spontaneous Emission). For this reason, a smaller value than the calculated value is more representative of the dynamics.

Still referring to FIG. 3, which is a circuit schematic of an example embodiment of the equivalent model 240 according to the invention, the state variable in the equivalent model 240 is the voltage at the capacitor 322. This voltage is equivalent to the stored energy (reservoir) in the optical amplifier in the fiber laser. The feedback loop to the equivalent circuit model 240 is via the control signal to the laser system 210. When this signal is logical high the model pump is on, represents pump excitation adding to the stored energy. The comparator 302 in the controller 230 turns the pump on and off to keep the voltage at the capacitor 322 at the set-point (Vset). A copy of the feedback signal (pump on/off) goes to the laser system 210 where it turns the pumps on and off to keeping the stored optical energy in the amplifier constant.

Figure 4A:
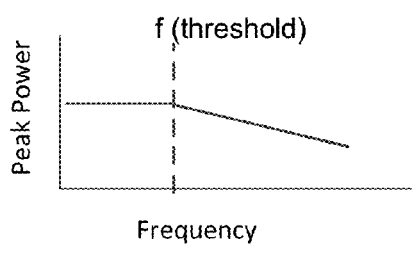
FIGS. 4A-D illustrate the power in a laser amplifier as a function of frequency and under gating with and without implementation of the control circuitry of FIG. 2.

FIGS. 4A-D illustrate the power in a laser amplifier as a function of frequency (FIGS. 4A and 4B) and under gating (FIGS. 4C and 4D) with and without implementation of the control circuitry 220 of FIG. 2. FIG. 4A shows the peak power or pulse energy for constant pulse width as the frequency (i.e., the pulse repetition frequency) is varied with the control circuitry 220 active. The peak power from the fiber amplifier remains constant even for low frequency. The power is limited by the control circuitry 220 which reduces the amount of delivered pump energy (i.e., power multiplied by the on-time). The threshold frequency can be referred to as a transition frequency or a threshold pulse repetition frequency. The threshold frequency is the point where the set point pulse energy is reached and the control device starts to reduce the amount of pumping to keep the pulse energy constant or follow a prescribed frequency dependency. As an example, the threshold frequency may fall in the 20 kHz to 100 kHz range for a particular laser design. By implementing the control circuitry 220, the power in the laser 210 does not shoot towards infinite as the frequency is lowered below the threshold frequency.

Experimental results have shown that the control circuitry 220 is able to stabilize the peak power from the threshold frequency to a single shot (<0.1 Hz). For frequencies greater than the threshold frequency, the power decreases slightly both with and without the control circuitry 220, since the pulse train can extract the energy supplied to the amplifier by the pumps at their maximum power so there is no energy buildup or room for control.

Figure 4B:
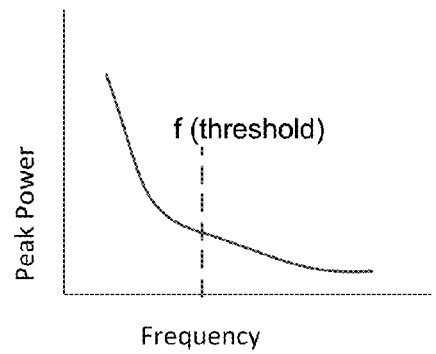

In FIG. 4B, without implementation of control circuitry 220, the peak power at low frequencies hyperbolically increases toward infinite. Without the power control provided by the control circuitry 220, the illustrated large uncontrolled peak power would provoke optical nonlinearities and eventually irreversible optical damage. The large power would destroy the laser 210. Without the control circuitry 220, the laser 210 would not be operable below the threshold frequency since the peak power would exceed safe limits for the laser 210.

Figure 4C:
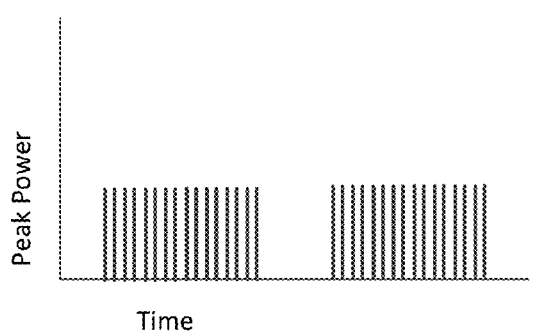
Figure 4D:
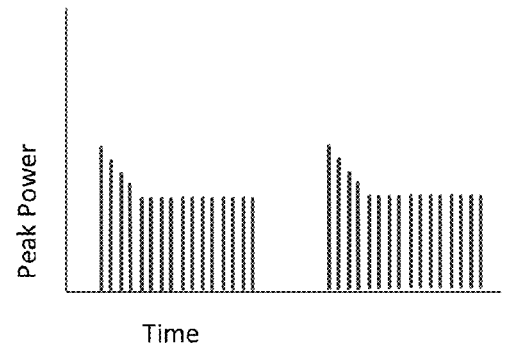

FIG. 4C illustrates the power in a laser amplifier under gating with the implementation of the control circuitry 220 of FIG. 2 and FIG. 4D illustrates the power in a laser amplifier under gating without the control circuitry 220.

Figure 5A:
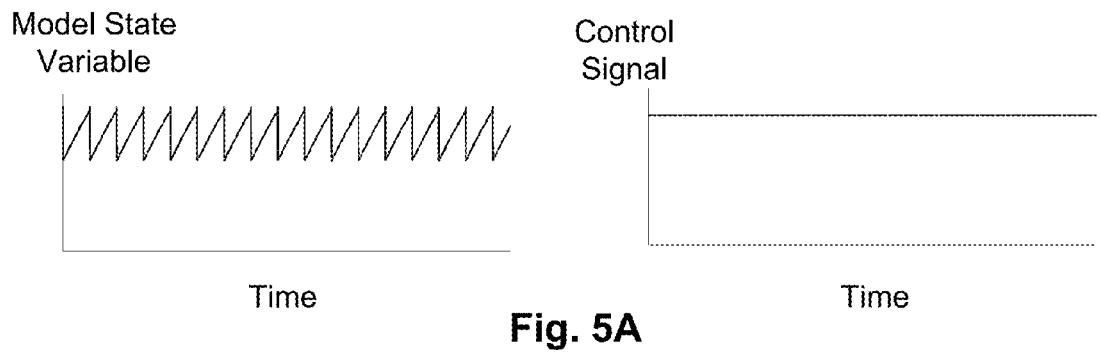
FIGS. 5A-C illustrate the model set point tracking and pump on/off control signal at different respective pulse frequencies of the laser system of FIG. 2.
Figure 5B:
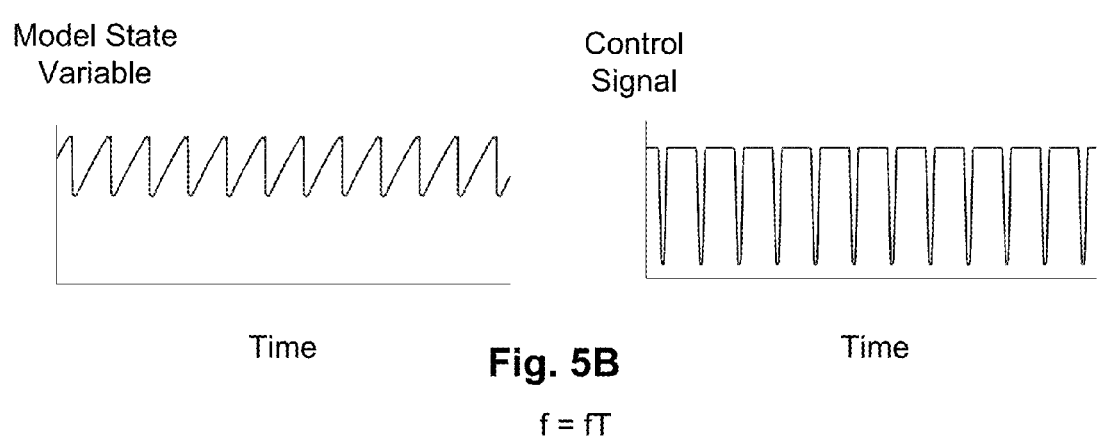
Figure 5C:
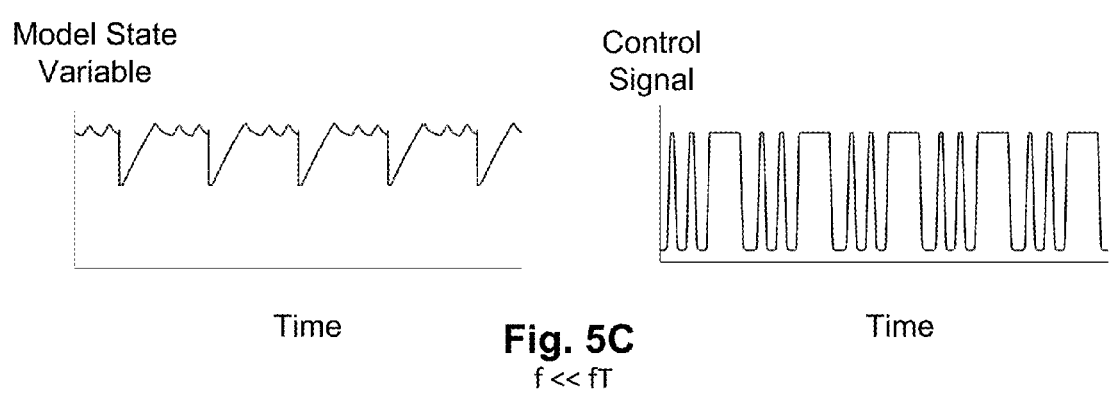

FIGS. 5A-C illustrate the model set point tracking and pump on/off control signal for three cases of pulse repletion frequencies (f) of the laser system 210; f>fT, f=fT and f<fT. In FIG. 5A, where the pulse train has a frequency greater than the threshold frequency, the model state variable is below the set-point showing fast drop at the instance of a pulse followed by recovery as a result of the pumping. The control signal is constant high, and thus, the pump stays on and population inversion is limited by the maximum available pump power. In FIG. 5B, where the pulse train is at the threshold frequency, the control signal is modulated by the closed feedback loop to keep the model state variable, i.e. the voltage across capacitor 322, at the set-point voltage. In FIG. 5C, where the pulse train has a frequency well below the threshold frequency, the control signal is off for a longer duration and gives short on bursts to recover from the spontaneous discharge in between the pulse.

The above describes how the disclosed control functions when the perturbation is a train of periodically repeated identical pulses. With the inventive control technique disclosed herein, all pulses in the gated burst of pulses will also have useful and near equal pulse peak powers. If the pump was not controlled, but the trigger was gated, the first pulse would overshoot strongly. In the other extreme, of gating the pumps and trigger, the turn on would be a slow rising curve. The control keeps the inversion at the level needed for the first pulse to reach the set point pulse energy, during the time in-between pulses. The control circuitry 220 provides excessively large average pump energy if the pulse repetition frequency is low compared to the inversion recovery time. When the pulse sequence is known or periodic, then the pump turn on can be delayed such that the pump does not immediately recover the inversion after a pulse is fired. Instead, the pump can turn on at a later time, still with enough lead time to the next pulse to bring the inversion up to the set-point.

In an embodiment of the invention, the control circuitry 220 can be used in pre-pumping mode (e.g., let the pulse start the pumping and fire the pulse when the model-inversion has reached the set-point). This could be done in the control circuitry 220 by using the pump on/off transition to fire the pulse. This approach can be combined with re-timing to keep jitter low.

In the analog circuit embodiment, negative and positive temperature coefficient resistors can be used in the charge and discharge path to compensate temperature dependencies in the optical system. For example, the optical pump rate may increase with reducing temperature and a positive temperature coefficient resistor used in the charge path compensates for the temperature dependency.

The pulse train gating response is characterized by a dip after the first pulse. This dip can be compensated by a pump burst with a delay relative to the first pulse. The pump-on or pulse signal can trigger a predefined pump burst sequence to implement this dip compensation.

The control circuitry 220 can include a seed pulse generation, a control model, and a pump driver. The control circuitry 220 may be prone to noise cross coupling. To minimize the effect of cross coupling, the preferred embodiment delays the power switching to after the more sensitive seed pulse generation and the control switching events.

The control circuitry 220 parameters can be tuned to deviate from the system of interest (e.g., the laser 210) to produce frequency dependencies of the pulse power other than constant, such as, for example, decreasing pulse energy with increasing frequency.

The fiber or optical amplifier may be made up of more than one pumped gain fiber section. In such case, one average model can be used for all sections together or individual controls used per section.

The pulse stimulated deexcitation, in the model through FET 344 is modeled in true time in the sense that an arbitrary temporal pulse shape or sequence of pulses will produce the correct control signal, driving the laser system to the set point average inversion.

The pump lasers may be biased to give some continuous pumping level when the amplifier/laser is enabled (also known as simmering). The control circuitry 220 can be used in combination with such simmering. In the model 240, the FET 352 circuitry provides a constant biasing. This simmering by pump pulsing provides a convenient way of achieving a controllable simmering with the main pump driver. Often the pump driver supplies several laser junctions and the total pump power at lasing threshold is too large for simmering, by pulsing the pump current the pumps can operate well above the lasing threshold and give a controlled low average power simmering.

The control circuitry 220 can be used even if the pulse generation does not originate in an electrical pulse. If the pulse generation is purely optical, a photo detector can be used to extract an electrical trigger signal via optical to electrical conversion. The conversion can be fast to give an exact electrical replica of the optical pulses or generate a signal with the same energy with an integration time faster than the gain dynamics.

Figure 6:
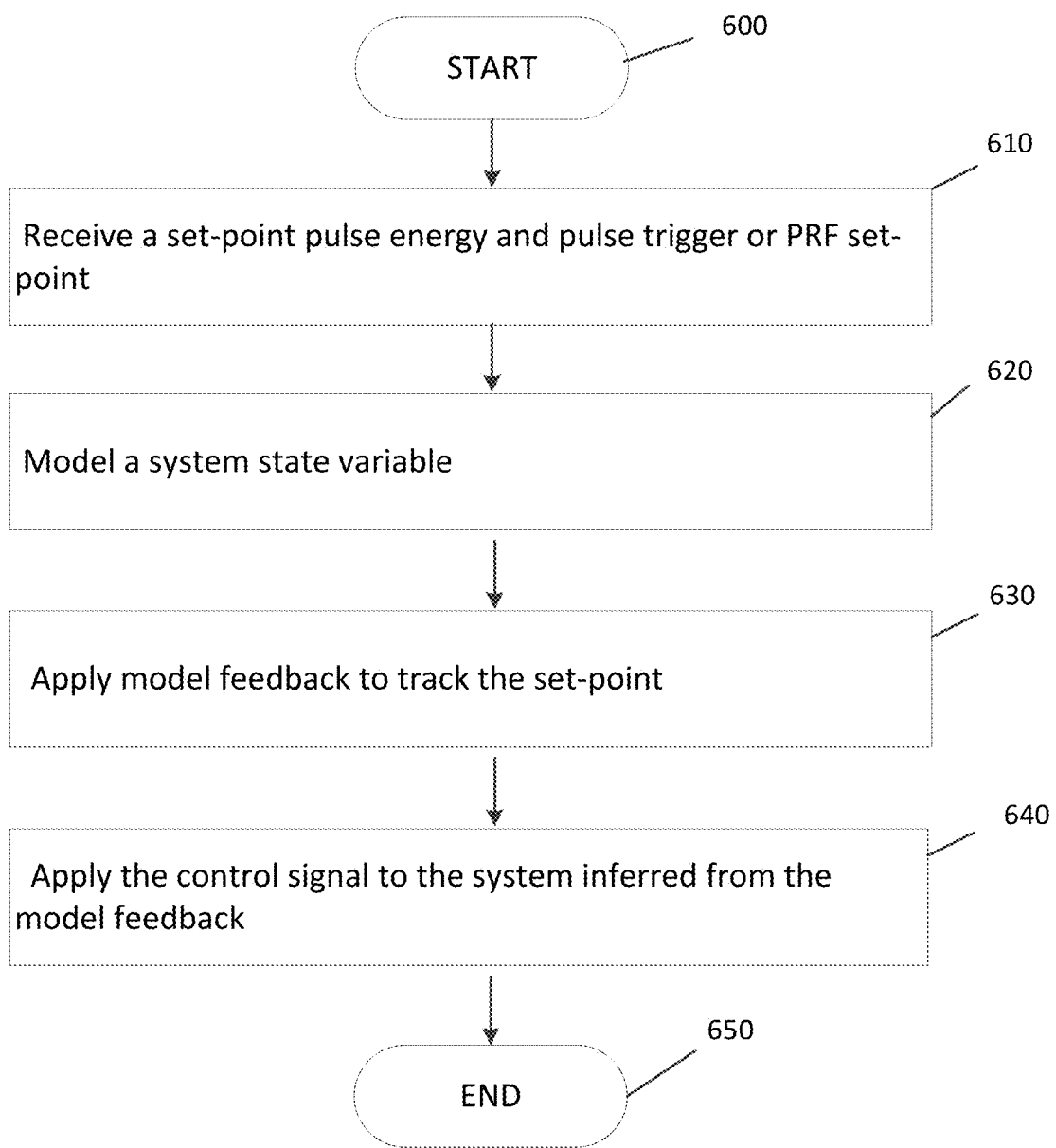
FIG. 6 illustrates a process of laser power control according to an embodiment of the invention.

FIG. 6 illustrates a process of laser power control according to an embodiment of the invention. The process starts at step 600. At step 610, the device 250 receives a set-point pulse energy and pulse trigger or PRF set-point. Then, at step 620, the model 240 models a system state variable. The control circuitry 220 then applies model feedback to track the set-point at step 630. Next, at step 640, the control circuitry 220 applies the control signal to the laser system 210 inferred from the model feedback. The process may be repeated recursively a number of times and ends at step 650.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways, for example, the model of the system may be implemented as analog electronics, gate array, by nonlinear counters, or by digital signal processing. Therefore, the invention should not be regarded as being limited in scope to the specific embodiments disclosed herein, but instead as being fully commensurate in scope with the following claims.

What is claimed is:

1. A laser control system comprising:
   a laser system comprising an optical amplifier coupled to a pump, the optical amplifier is fed by an optical pulse source, the laser system having an optical pulse output; and
   control circuitry, the control circuitry comprising:
      a controller receiving as input a set point voltage that reflects a desired power level of the optical pulse output; and
      an equivalent model circuitry coupled to the controller, the equivalent model circuitry models a magnitude of population inversion within the optical amplifier, wherein the equivalent model circuitry receives a pulse command signal associated with the optical pulse source and generates a voltage output that is a real-time estimate of the magnitude of population inversion within the optical amplifier as modeled by the equivalent model circuitry,
      wherein the controller receives the voltage output of the equivalent model circuitry and outputs a control signal, which is coupled to an input of the equivalent model circuitry and the pump in order to control the pump's power, wherein the equivalent model circuitry and the control circuitry do not receive as input the optical pulse output of the laser system.

2. The laser control system of claim 1, further comprising a sensor coupled to the equivalent model circuitry and the controller, wherein the sensor measures the voltage output of the equivalent model circuitry.

3. The laser control system of claim 1, wherein the equivalent model circuitry comprises digital circuitry.

4. The laser control system of claim 3, wherein the digital circuitry comprises gate arrays or numerical processing.

5. The laser control system of claim 1, wherein the equivalent model circuitry is configured to give a prescribed deviation to produce a pulse energy dependency on frequency.

6. The laser control system of claim 1, wherein the model further comprises temperature compensation.

7. The laser control system of claim 1, wherein the pump command signal is configured to be shaped to compensate for a dip in a gated burst of pulses.

8. The laser control system of claim 1, wherein the optical amplifier is a fiber amplifier.

9. A laser control device comprising:
   a controller receiving as input a set point voltage that reflects a desired power level of an optical pulse output of a laser system; and
   an equivalent model circuitry coupled to the controller, the equivalent model circuitry models a magnitude of population inversion with an optical amplifier of the laser system, wherein the equivalent model circuitry receives a pulse command signal associated with an optical pulse source of the laser system and generates a voltage output that is a real-time estimate of the magnitude of population inversion within the optical amplifier of the laser system;
   wherein the controller receives the voltage output of the equivalent model circuitry and outputs a control signal, which is coupled to an input of the equivalent model circuitry and a pump of the laser system in order to control the pump's power, wherein the equivalent model circuitry and the control circuitry do not receive as input the optical pulse output of the laser system.

10. The laser control device of claim 9, further comprising a sensor coupled to the equivalent model circuitry and the controller, wherein the sensor measures the voltage output of the equivalent model circuitry.

11. A laser control method comprising the steps of:
   receiving, at control circuitry, a set point voltage that reflects a desired power level of an optical pulse output of a laser system comprising an optical amplifier coupled to a pump and an optical pulse source;
   modeling, at the control circuitry, a magnitude of population inversion within the optical amplifier;
   receiving, at the control circuitry, a pulse command signal associated with the optical pulse source;
   generating, at the control circuitry, a voltage output that is a representation of the magnitude of population inversion within the optical amplifier;
   generating a control signal that is based on a difference between the voltage output and the set point voltage; and applying the control signal to the pump in order to control the pump's power, wherein the modeling and the control circuitry do not receive as input the optical pulse output of the laser system.

12. The laser control method of claim 11, further comprising the step remodeling, at the control circuitry, a magnitude of population inversion within the optical amplifier using the control signal.

13. The laser control method of claim 11, wherein the optical amplifier is a fiber amplifier.

* * * * *